United States Patent [19]

Gass et al.

[11] Patent Number: 5,485,454
[45] Date of Patent: Jan. 16, 1996

[54] SYSTEM AND METHOD OF COMMUNICATION BETWEEN CIRCUIT MODE COMMUNICATION INSTALLATION CORE UNITS

[75] Inventors: Raymond Gass, Bolsenheim; André Ruhlmann, Marmoutier, both of France

[73] Assignee: Alcatel N.V., Amsterdam, Netherlands

[21] Appl. No.: 937,577

[22] Filed: Aug. 28, 1992

[30] Foreign Application Priority Data

Aug. 29, 1991 [FR] France ................................ 91 10736

[51] Int. Cl.⁶ .................................................. H04L 12/52
[52] U.S. Cl. .................................... 370/58.3; 370/94.3
[58] Field of Search ................................ 370/60, 60.1, 61, 370/58.1–58.3, 110.1, 94.1, 94.2, 94.3, 112, 54

[56] References Cited

U.S. PATENT DOCUMENTS

| | | | |
|---|---|---|---|
| 4,543,652 | 9/1985 | Amada et al. | 370/58.1 |
| 4,575,839 | 3/1986 | Ogata et al. | 370/58.1 |
| 4,646,287 | 2/1987 | Larson et al. | 370/60 |
| 4,734,908 | 3/1988 | Hedlund | 370/60 |
| 4,757,497 | 12/1988 | Beierle et al. | 370/94.3 |
| 4,841,522 | 6/1989 | Yamazaki | 370/58.1 |
| 4,903,261 | 2/1990 | Baran et al. | 370/94.2 |
| 5,056,058 | 10/1991 | Hirata et al. | 370/94.1 |
| 5,056,086 | 10/1991 | Libonati | 370/58.2 |
| 5,067,125 | 11/1991 | Tsuchida | 370/60 |
| 5,093,827 | 3/1992 | Franklin et al. | 370/60.1 |
| 5,101,404 | 3/1992 | Kunimoto et al. | 370/60 |

FOREIGN PATENT DOCUMENTS 0073078  2/1983  European Pat. Off. .

OTHER PUBLICATIONS

M. Akiyama et al., "Mesh Type Distributed Packet Switching Systems", *The Transactions of the IECE of Japan*, vol. E 68, No. 2, pp. 59–64.

C. Duret, J. P. Henry, "Experimental Nodal Switching System", *ISS'81 CIC Montreal*, 21–25 Sep. 1981, pp. 1–6.

Primary Examiner—Douglas W. Olms
Assistant Examiner—Chau T. Nguyen
Attorney, Agent, or Firm—Robbins, Berliner & Carson

[57] ABSTRACT

In a system and method of communication between circuit mode units interconnected by point-to-point circuits in a subnetwork at the core of a communication installation the point-to-point circuits between units are structured and managed identically. A communication circuit is incorporated in each unit of the subnetwork, irrespective of the control unit, auxiliary unit or telephone and/or communication terminal interface controller type. This communication circuit handles the broadcasting over the point-to-point circuits to the other units of data from time-division multiplex circuits connected to it and switching of bytes addressed to it over the circuits.

15 Claims, 4 Drawing Sheets

FIG. 10

SYSTEM AND METHOD OF COMMUNICATION BETWEEN CIRCUIT MODE COMMUNICATION INSTALLATION CORE UNITS

BACKGROUND OF THE INVENTION

1. Field of the invention

The invention concerns a system and a method of communication between circuit mode communication installation core units interconnected by point-to-point circuits.

2. Description of the Prior Art

French patent application 9009442 describes an interconnect network which functions as a core component of a digital communication installation, an integrated services type installation, for example, in which the units of the interconnecting network are interconnected by point-to-point circuits adapted to their specific requirements.

An interconnect network of this kind comprises, for example, a subnetwork of digital installation core units supporting circuit mode, i.e. units operating directly or indirectly in the core during synchronous time-division switching of data successively transferred in the form of binary blocks (frames) of the same size, a block routinely comprising one byte and the transfer period being 125 µs in the conventional case of 64 kbit/s circuit switching.

This enables the transfer of structured information at 8 kHz, including speech or other audio frequency signals sampled and encoded in the form of bytes and data also in the form of bytes.

The units concerned are usually the various telephone type units, their control units and possibly associated auxiliary units (known as service circuits).

The telephone units are, for example, of the analog telephone interface controller type (CCITT S0/T0 or S2/T2 level, or a chosen specific level).

The invention therefore proposes a system of communication between circuit mode core units interconnected by point-to-point circuits of a communication installation comprising at most "n" units.

SUMMARY OF THE INVENTION

According to one feature of the invention, the point-to-point circuits between units form a communication subnetwork in which all the circuits are structured and managed in exactly the same manner, each unit, whether of the control unit, auxiliary unit or telephone and/or communication terminal interface controller type, comprising the same communication circuit for its communications with the other units to which it is connected by point-to-point circuits, each communication circuit comprising "n" point-to-point circuit ports and "q" time-division multiplex circuit ports serving telephones and/or terminals connected to the unit comprising the communication circuit in question and possibly relevant special-purpose circuits of that unit, said communication circuit handling, under the control of an associated microprocessor, the broadcasting of data to at least one other unit during each frame of duration "T" in the form of bytes via the "q×r" channels of incoming links of time-division multiplex circuits connected to it, possibly to its "n" point-to-point circuit ports and possibly handling switching of bytes arriving on at least some of any "r×q" channels selected from the "p×n" channels that can be supplied to it, by the point-to-point circuits during a frame of duration "T".

The invention also consists in a method of communication between circuit mode core units interconnected by point-to-point circuits of a communication installation comprising at most "n" units and arranged and adapted as specified above. According to one feature of the invention each successive frame of duration "T" (which is the same for the circuit mode point-to-point circuits between units and for the circuit mode time-division multiplex circuits servicing telephones and/or terminals connected to the installation at a unit or serving respective dedicated circuits) is identically divided into "r×q" equal time slots on each of the point-to-point circuits between two circuit mode units of the installation, "r" being equal to the number of channels on a time-division multiplex circuit and "q" being the number of these time-division multiplex circuits per communication circuit.

The invention, it features and its advantages are explained in the following description with reference to the figures listed below.

DETAILED DESCRIPTION OF THE INVENTION

Figure 1:
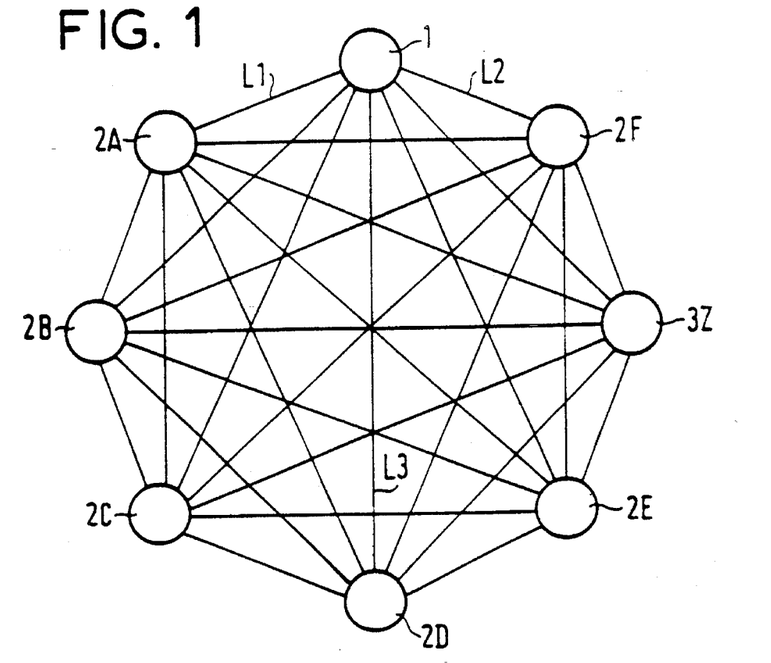
FIG. 1 is a diagram showing the general principle of a communication installation core interconnect network.

The communication installation core interconnect network shown in FIG. 1 is designed to link the units constituting a communication installation, for example a keyphone installation or an integrated services digital network (ISDN) type PABX.

These units are implemented on individual circuit boards (not shown) which are grouped together within a common cabinet or case type structure in which the core of the installation is therefore located.

These boards are interconnected by an interconnect network implemented on a backplane (not shown) to which the boards connect at board locations comprising appropriate connectors.

A communication installation conventionally comprises at least one board for a control unit 1 usually based on at least one processor with read only memories and/or random access memories, these component parts being omitted here because they are well known to the man skilled in the art.

A communication installation as envisaged here further comprises individual circuit boards for input-output units or interface controllers 2 (2A through 2F) designed for usually two-way transmission of data between communication instruments such as telephones, terminals, servers or any other service user or service provider equipment.

These known communication instruments, which are not shown here, are adapted to be connected in a known way to the installation either directly, for example by wired circuits, or indirectly by means of circuits which connect the installation to other installations to which the instruments in question are directly connected.

These other installations and their interconnect circuits are not directly relevant to the present invention and are not shown or described here; the same applies to the circuits connecting the interface controllers 2 to any communication instruments connected to them in the installation in question and to other installations.

The communication installation envisaged here possibly comprises an auxiliary unit (service circuit) board 3 (3Z, for example) adapted to assist one or more other units by providing a common function for them, for example a specific transcoding operation required by the interface controller(s) 2 transmitting the data to be transcoded and also by the control unit 1 responsible for supervising operations relating to this data within the installation.

Auxiliary unit boards 3 may also be present if a single board is insufficient to carry a unit 1 or 2, in the known manner.

Each unit 1, 2 or 3 of an installation comprising "n" units is connected to each of the other units by a physical point-to-point circuit.

Each point-to-point circuit between units, such as the circuit L1 between the control unit 1 and the interface controller 2A, is adapted to the specific requirements of the two units concerned and may if necessary be constructed and managed in ways totally different to the other circuits of the installation, such as the circuit L2 between the units 1 and 3Z or the circuit L3 between the units 1 and 2D.

The same unit may be connected to a plurality of differently constructed and/or managed circuits, given that in practice the number of different circuits actually used by the same unit is small as compared with the number of circuits available to it.

Consequently, it is possible to consider the interconnect network between units as made up of subnetworks each connecting the units contributing to the provision of a different service, for example a circuit mode subnetwork as here proposed and a packet mode subnetwork.

The units used for a common service are then interconnected by circuits which are identical for the same type of data (signalling data, for example).

The units of the subnetwork for the same type of data, which are connected by identical point-to-point circuits, themselves form a subset adapted to cooperate with a separate subset for another type of data or possibly with a plurality of other subsets in the subnetwork concerned for providing the service specific to that subnetwork.

The units (in particular the control unit 1) which participate in the transmission of different types of data in the same subnetwork and/or the provision of different services in the same installation are then individually connected to respective different subsets and/or subnetworks.

Figure 2:
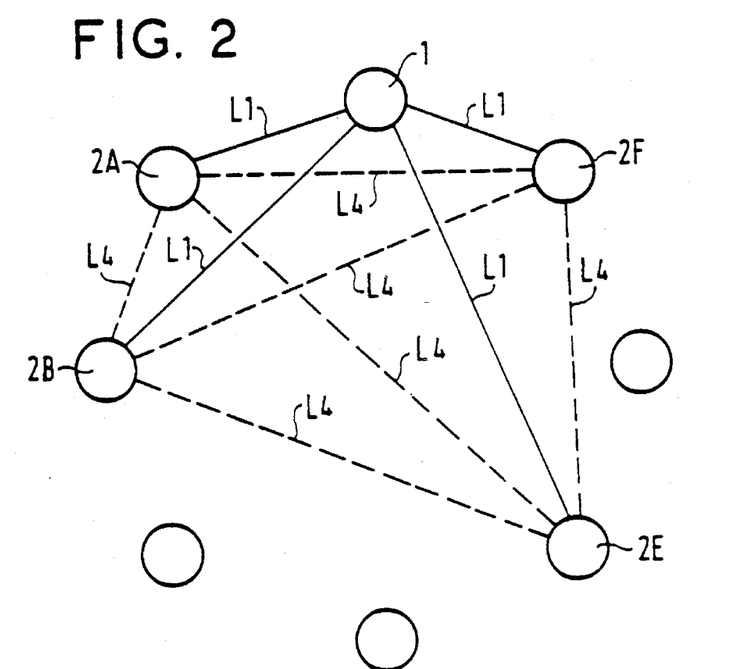
FIG. 2 is a diagram showing the general principle of an interconnect subnetwork of circuit mode data processing units.

The subnetwork shown in FIG. 2 is for providing a circuit mode data transmission service between units of a communication installation core.

It combines at least one control unit with more specifically telephone units which comprise, for example, an analog telephone interface controller 2A, a CCITT S0/T0 level interface controller 2B, a CCITT S2/T2 level interface controller 2E or a given standard interface controller 2F.

All these units are adapted for circuit mode data transfer (as defined above) between them within the installation over identical point-to-point circuits L1 or L4, the latter being shown in dashed line in FIG. 2.

The units interconnected by the circuits L1 form a first subset which constitutes the subnetwork for circuit mode data transfer with the subset of units connected by the circuits L4.

These circuits L1 and L4 are bidirectional and use exactly the same frame structure, differing essentially in that the circuits L1 are essentially intended for bidirectional transfer of signalling between the interface controllers and the control units whereas the others are essentially intended for circuit mode speech or data transfer.

For either type of circuit, each frame is subdivided into "p" equal time slots and enables transfer of data by means of "p" channels having a unit bit rate of 64 kbit/s, "p" being equal to 128, for example.

The construction of these circuits L1 and L4 is exactly the same, each comprising four conductive tracks, the outer two conductive tracks here providing a ground line on each side of two central unidirectional transmission tracks, one for each direction.

Figure 3:
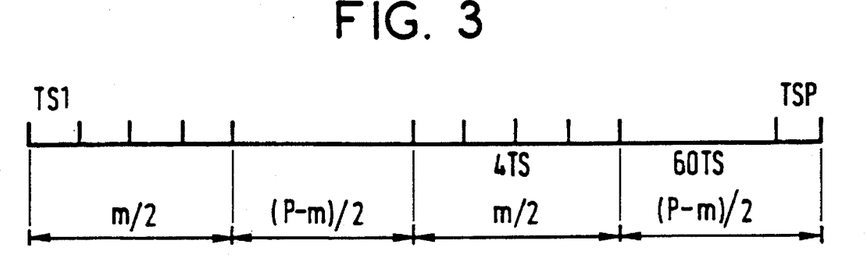
FIG. 3 shows one example of a frame structure for circuit mode interconnect subnetwork circuits.

In the embodiment shown in FIG. 3 "m" time slots of each frame are assigned to the transfer of signalling bytes, either essentially between interface controllers 2 and control unit(s) 1 via the circuits L1, the "p–m" other time slots being assigned to the transfer of data, or essentially between interface controllers via the circuits L4, the number "m" being an integer number substantially lower than the number "p".

By way of example, the first "m/2" time slots of each frame are reserved for transfer of signalling bytes between control unit(s) and interface controllers and are immediately followed by "(p–m)/2" time slots reserved for transferring data bytes between interface controllers which are themselves followed by "m/2" time slots reserved for transfer of signalling between interface controllers and control unit(s), the remaining "(p–m)/2" time slots being also assigned to transfer of data bytes between interface controllers.

In a preferred embodiment all of the units 1, 2 and possibly 3 of a circuit mode data communication subnetwork in an installation are identically provided with the same communication circuit 4, preferably of the integrated type, for exchange of data via this subnetwork.

Figure 4:
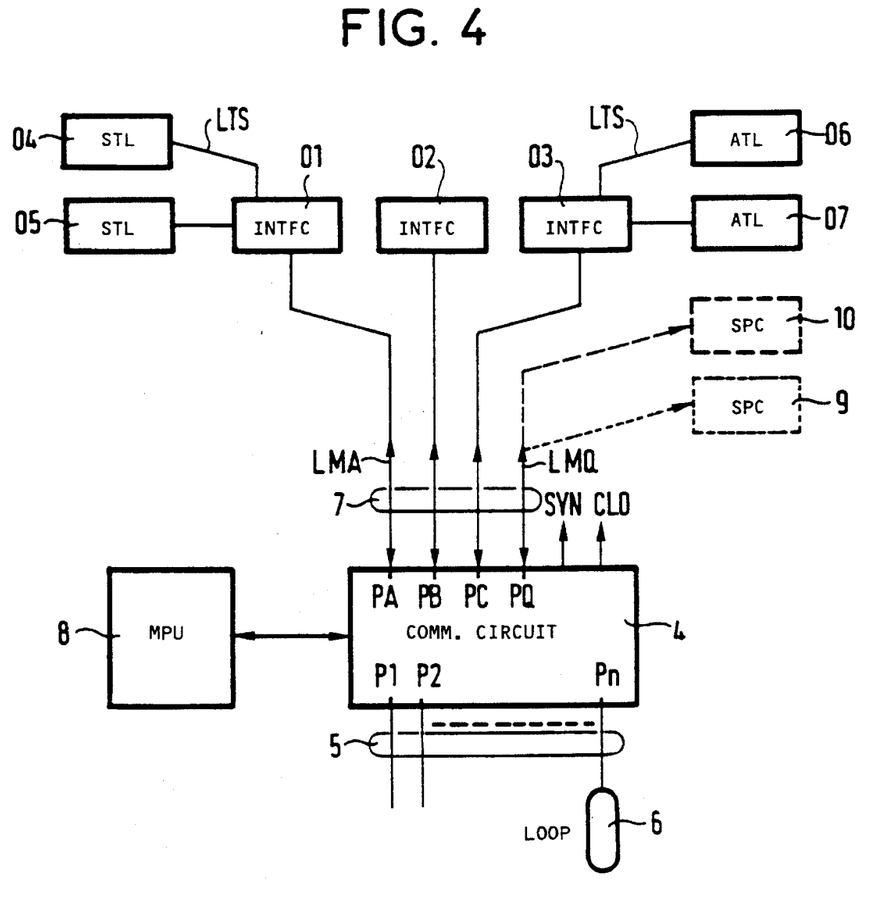
FIG. 4 is a block diagram of a communication circuit for an interconnect subnetwork as defined with reference to FIG. 2.

FIG. 4 is a block diagram of a communication circuit 4 of this kind and shows that each communication circuit 4 is adapted to be connected to a microprocessor (MPU) 8 responsible for supervising it within the unit that comprises it.

A communication circuit 4 has "n" ports P1, P2, . . . Pn individually connecting a group 5 of "n" point-to-point circuits L4 or L1 for exchanging data either with the communication circuits 4 of other units of the installation or possibly with itself, the input of one of these "n" ports being linked to its own output, here by a loop 6 implemented at the port Pn.

The loopback is effected, for example, at the position to which the board comprising the communication circuit concerned is connected, i.e. on the backplane where the various point-to-point circuits between units of the installation in question are implemented.

A communication circuit 4 also comprises "q" ports PA, PB, PC, . . . PQ connecting bidirectional time-division multiplex circuits LMA through LMQ which define a group 7 serving the unit which comprises this circuit.

These circuits, of which there are four in the envisaged implementation, for example, are of conventional type with 32 channels and can be used to serve line or subscriber connection interfaces 01, 02, 03 and special-purpose circuits (SPC) 9, 10.

The connection interfaces are, for example, subscriber terminal line (STL) modules 04 and 05 connected to the installation at the CCITT S0 or T0 level, analog telephone line (ATL) modules 06 and 07, etc.

The special-purpose circuits are, for example, a tone generator 10 in the case of a unit serving subscriber telephone terminals and/or a signal processor 9 in the case of a unit which has to process multifrequency signalling and/or signals transmitted in the form of tones.

A communication circuit 4 additionally comprises a clock circuit (not shown) which enables it to extract clock signals CLO and synchronization signals SYN from the signals it receives, for example via one of the circuits in which it is connected, on behalf of circuits and connection interfaces included in or served by the unit which comprises it.

Figure 5:
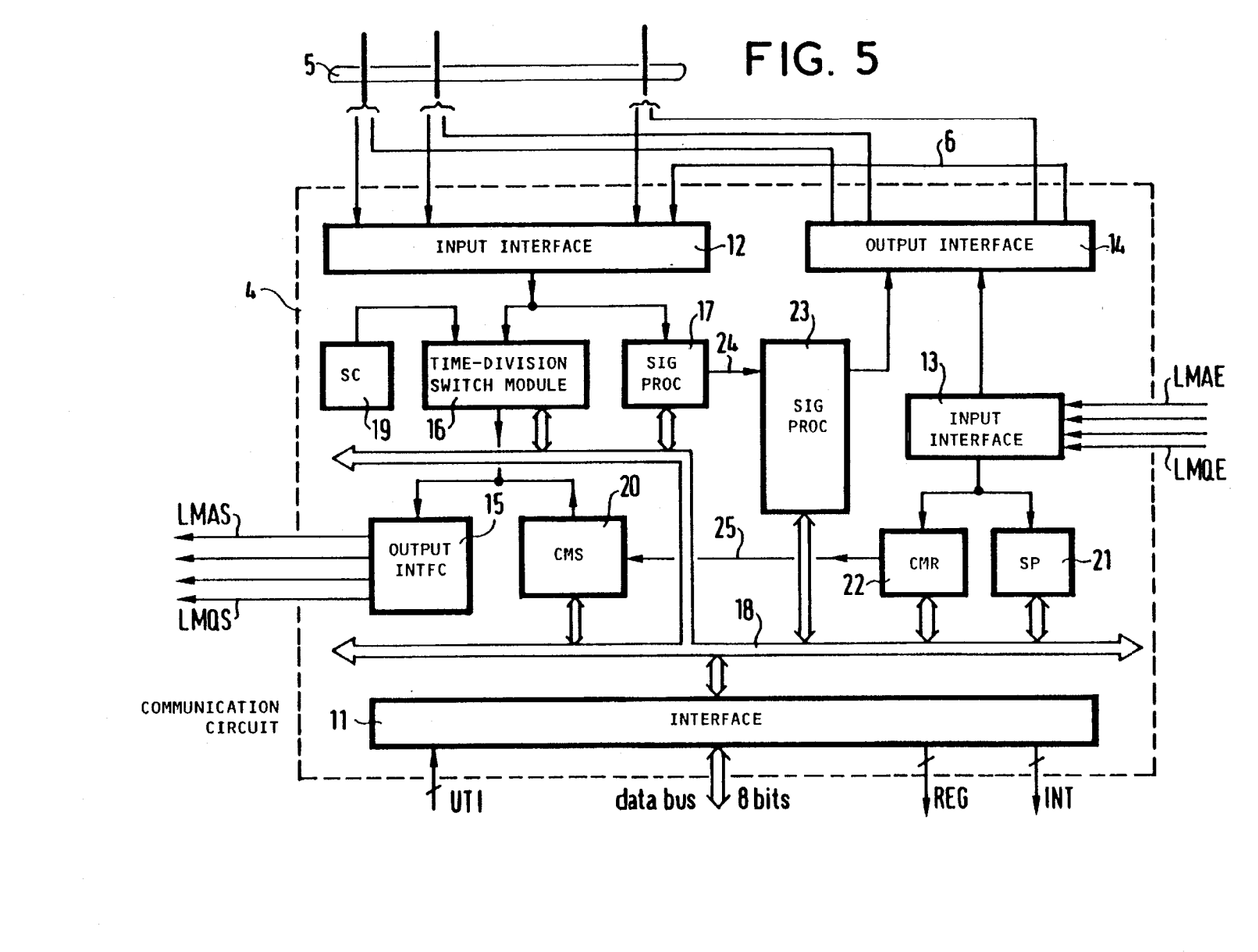
FIG. 5 shows one example of internal structure for a communication circuit according to FIG. 4.

The communication circuit 4 from FIG. 4 is shown in more detail in FIG. 5. It comprises an interface 11 enabling it to be connected to the microprocessor 8, respective input interfaces 12 and 13 for the incoming unidirectional links of the circuits L4 or L1 of the group 5 which serves it and for those of the circuits LMAE through LMQE of the group 7 which also serves it and output interfaces 14 and 15 also connecting this circuit to the outgoing unidirectional links of the circuits of the group 5 for one and of the group 7 for the other, the latter being the circuits LMAS through LMQS in FIG. 5.

The interface 11 provided for a microprocessor 8 in a communication circuit 4 is of known design and enables connection of the communication circuit to the data bus that the microprocessor 8 comprises, sending interrupts and data transmission requests to the microprocessor via dedicated circuits INT and REQ and receiving select, write, read, reset, test, etc instructions, symbolically represented by a circuit UTI.

The input interface 12 receives and synchronizes in a manner that is known in itself the digital signals incoming simultaneously from the incoming links of the various circuits of the group 5 and multiplexes bytes from incoming links transmitting to the unit which comprises it, preferably after serial-to-parallel conversion of the bits received serially for each of these bytes.

These bytes are transmitted either to a time-division switching module 16 for transmission via outgoing time-division multiplex circuits of the group 5 or to a signalling processor 17, according to their respective destinations.

The time-division switching module 16 is inserted between the input interface 12 and the output interface 15.

It is of the type described in French patent application 91 02623, for example, and is used in particular to connect any one of the channels of the incoming links of the circuits of the group 5 to any one of the "rxq" outgoing channels of the time-division multiplexed circuits of the group 7.

In this embodiment, the number of incoming channels that can be processed by a time-division switching module 16 is equal to 4 096 and enables servicing of a group 5 of incoming links of 30 circuits L4 or L1 in which each link comprises 128 channels and two internal links representing 256 incoming channels used directly by the communication circuit itself; the numbers "q" of multiplexed circuits of group 7 and "r" of channels are respectively equal to 4 and 32.

In this embodiment, some of the channels reserved for the switching module input unit are assigned to bytes transmitted by the loop 6, others being assignable to the transmission of predetermined bytes by a state controller (SC) 19 (in particular one for subscriber terminals) via channels of the outgoing unidirectional links LMAS through LMQS which serve them.

A switching module of this kind is controlled, for example, by a content-addressed memory as described in French patent application 91 06654.

The signalling processor 17, which is of the programmable logic array type, for example, deals with messages from a control unit 1 of the installation on behalf of the unit which comprises the switching circuit 4 in question.

The time-division switching module 16 and the processor (or receiver) 17 are controlled by the microprocessor 8 according to the program assigned to the latter and messages for the unit which comprises them originating from the control unit or units of the installation.

To this end the microprocessor 8 has access via a bust 18 to the time-division switching module 16, to the signalling receiver 17 and to other component parts of the communication circuit 4 via the interface 11.

In an optional embodiment, a control message sender (CMS) 20 is connected to the input of the output interface 15 in parallel with the time-division switching module 16 to enable direct injection of messages by the microprocessor 8 onto the outgoing unidirectional links LMAS through LMQS, bypassing the switching module 16.

The input interface 13 is adapted in a known manner to receive data from the incoming unidirectional links LMAE through LMQE of the time-division multiplex circuits of the group 7 in order to transfer bytes received from the various channels either to the output interface 14 or to the microprocessor 8 via a signalling processor.

The bytes, usually of speech or data, transmitted by the links LMAE through LMAS to the output interface 14 are at least potentially liable to be broadcast by the latter to all the units of the installation which are connected to the communication circuit 4 in question by a circuit of the group 5 and to this communication circuit 4 by the loop 6, consisting of a single link.

To this end, the output interface 14 temporarily stores bytes to be transmitted so that these bytes are sent during time slots of predetermined channels on the outgoing links of the circuits of the group 5, for example under the control of the clock circuit (not shown) of the communication circuit 4 of which this output interface forms part.

Each byte arriving at the output interface 14 via an incoming link of one of the time-division multiplex channels LMAE through LMAS during a specific time slot, is adapted to be broadcast to all the circuits of the group 5 during another specific time slot following that in which it arrived by a time-delay less than the duration of a frame "T" (125 µs in this example).

The signalling bytes transmitted by the incoming links LMAE through LMAS are likely to represent observations or indications translated into the form of states which are then transmitted to the microprocessor 8 via a state preprocessor (SP) 21 connected to the input interface 14 and to the bus 18 providing access to the microprocessor 8.

In the optional embodiment mentioned above a control message receiver (CMR) 22 is also connected between the input interface 14 and the microprocessor 8, via the bus 18 in the case of the latter, in order to preprocess on behalf of the microprocessor 8 message type signalling usable by certain units, for example certain interface controllers of specific terminals.

The communication circuit 4 further comprises a signalling processor 23 for producing the messages that the processor 8 is able to send to a control unit 1 of the installation.

This processor (or sender) 23 is to this end connected to the bus 18 and to the output interface 14 in parallel with the input interface 13.

Each message byte from the microprocessor 8 of an installation unit to a control unit 1 of the installation can be broadcast in a common time slot to all of the outgoing links of the circuits of the group 5. Usually it is transmitted only on the outgoing links serving units likely to be interested in its content, which are the only units activated.

The message receiver 17 and the message sender 23 communicate with each other via a link 24 and the units 22 and 20 communicate via a link 25, these links 24 and 25 enabling each receiver to operate on the respective sender, in particular when the reception of a byte by a receiver 17 or 22 conditions the transmission of a byte by the respective sender 20 or 23.

As mentioned above communications on the circuits L1 and L4 use the "p" channels corresponding to the "p" frame time slots TS1 through TSp—FIG. 3—on each of these circuits. In one embodiment transmission from the interface controllers to the control units and transmission in the opposite direction on the circuit L1 are effected in different reserved time slots, the first "m/2" time slots of each frame being used for some and the first "m/2" time slots after each half-frame being used to send the others.

Any sending of data from a control unit to an interface controller or vice versa is preceded by an access request sent by the originator to the recipient that it wishes to reach.

Figure 6:
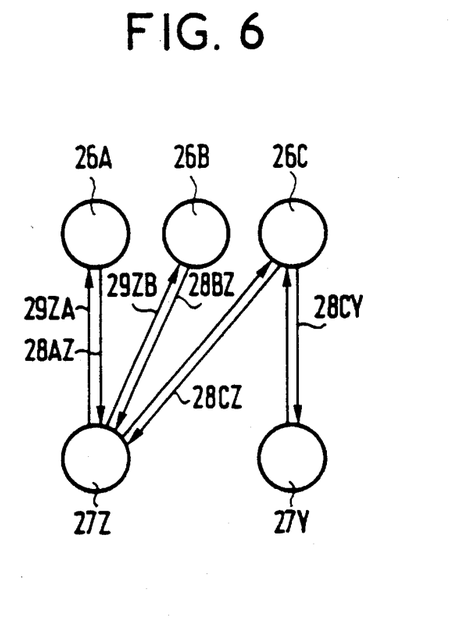
FIG. 6 is a diagram relating to part of the FIG. 2 subnetwork.
Figure 7:
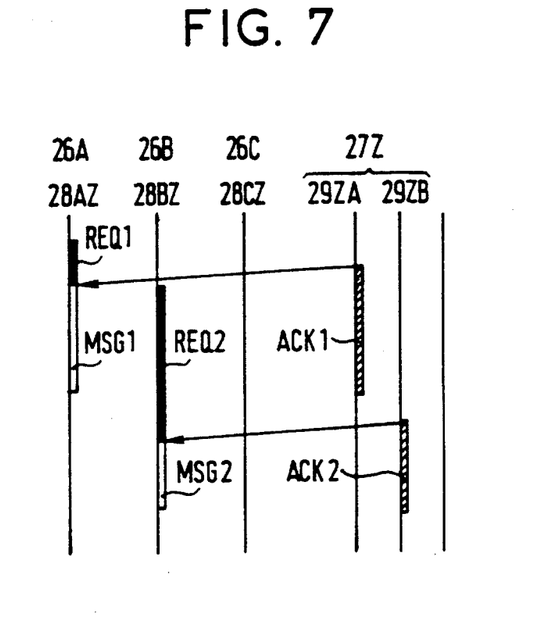
FIG. 7 is a diagram relating to the method of communication between control units and interface controllers of the FIG. 2 subnetwork.

FIG. 6 shows three potential originators 26A, 26B, 26C and two receivers 27Y and 27Z, for example three interface controllers and two control units or vice versa.

As already seen, these interface controllers and these control units are interconnected by point-to-point circuits of type L1 if they are to communicate with each other.

In the present example, one of the two links of an L1 type circuit is used to send access requests from an originator located at one end of this circuit to the other end at which the recipient is located (for example the link 28AZ from 26A to 27Z or the link 28CY from 26C to 27Y).

Any originator requiring to send data to a recipient starts by submitting an access request to the latter in the channel reserved to it according to its type, i.e. in this instance according to whether it is a control unit or an interface controller, on the link which connects it to this recipient for sending.

This access request (e.g. the request REQ1 sent by the originator 26A to the recipient 27Z on the link 28AZ) comprises a specific byte or bytes, for example.

An access request is transmitted in the channel reserved to the originator, here according to its type, as mentioned above, the same frame time slots being here reserved to originators of the same type on the links which they use individually for sending.

A given recipient such as 27Z may receive a plurality of simultaneous access requests such as REQ1 and REQ2 from separate originators such as 26A and 26B via different links such as 28AZ and 28BZ (in this case).

Each recipient watches out for access requests sent to it (simultaneously or not) and chooses one of them according to criteria that need not be described here.

The choice effected by a recipient such as 27Z results in the sending of an authorization to transmit such as ACK1 in the channel which is reserved to it according to its type on the link enabling it to send to the chosen originator, either on the link 29ZA associated with the link 28AZ in the L1 type circuit that they constitute for the originator 26A, in the chosen example.

Sending an authorization to send to an originator leads to transmission of data by the latter, in respect of which it has previously sent an access request, on the channel used for the access request and on the same link as the latter, i.e. the link 28AZ in the case of the request REQ1.

Data is preferably embodied in messages.

Each of these messages such as MSG1 comprises for example a flag byte followed by a byte giving the length of the message in bytes followed by the data bytes of the message, the combination being sent on the link concerned (28AZ in this instance) in blocks of "m" bytes in consecutive frames, the number "m" being equal to 4, for example.

In the present example messages from different originators such as MSG1 and MSG2 to the same recipient such as 27Z are sent successively to the latter as and when available, each originator maintaining its access request such as REQ2 by sending the corresponding bytes again until it receives the expected authorization to send.

There is provision for broadcasting the same request and/or the same message to all the addressees in the subnetwork likely to be interested.

Given that the method defined hereinabove is asymmetric, it is possible for two units of the installation which are connected by a common L1 type circuit to attempt to act simultaneously by sending to the other.

However, if they are not of the same type they do not use the same frame time slots for their respective channels and one will necessarily precede the other in sending its access request. This enables the other unit to send an authorization to send and results in said other unit not receiving the authorization to send that it is awaiting before it has received all of the message addressed to it.

The circuits L4 are managed in a different way to the circuits L1 in that there is no access request procedure for transferring data via one of the "p–m" channels available on each of the opposite direction links of a circuit L4, the latter being preferably assigned permanently to the various senders connected to the two interface controllers served by this circuit.

In one embodiment these senders send continuously on the channel(s) respectively assigned to them on a link bytes representing wanted data or "filler" bytes in the absence of any data. These senders are for example the cofidecs of terminals connected to the interface controllers served by the circuit 4 in question.

The time-division multiplex circuits LMA through LMQ—FIG. 4—for connecting connection interfaces such as 01 or dedicated circuits such as 9 to a communication circuit 4 in a unit of an installation in accordance with the invention are also specifically structured.

In one embodiment intended for a standard interface controller such as 2F comprising a communication circuit 4 provided with connection interfaces for digital telecommunication terminals the connection interfaces are connected to the communication circuit 4 of the interface controller by time-division multiplex circuits such as LMA administered in a particular way.

Figure 8:
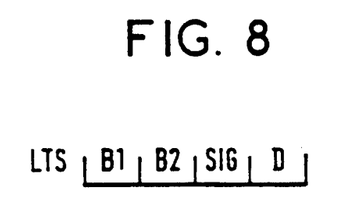
FIGS. 8, 9, 10 respectively show examples of structures for time-division circuits between a sending digital terminal and a connecting interface for such terminals, for time-division multiplex circuits between an interface and a communication circuit and for circuits between communication circuits of different units.

The bytes from a digital terminal are to be transmitted to the connection interface which serves it over a time-division circuit such as LTS—FIG. 4—by the system shown in FIG. 8.

This circuit LTS is assumed to be governed by a frame whose period (equal to "T") is 125 μs and in which each terminal has a particular series of "v" successive channels from "r" per frame on this circuit, that is, in the present example, a series of four bytes, "v" being chosen equal to "m". These bytes are then respectively distributed between two bytes B1 and B2 of different B channels, a terminal/interface controller signalling byte SIG and a signalling byte D for CCITT LAP-D type signalling between the terminal and the remainder of the network of which the installation that comprises it forms part, which is of the ISDN type.

In a way that is known, the B type channels are used in particular for telephony proper, sending data by telephone using modems, facsimile, etc.

The D type channels are used for subscriber terminal signalling and possibly for low bit rate data transfer or sporadic character mode data transfer to or from the terminals.

The system defined hereinabove is also used in a simplified form for terminals or telephones requiring only a number of channels less than "v".

The bytes received by a connecting interface from terminals or telephones served by links governed according to the system defined hereinabove and for purposes of transmission are sent on the links such as LMAE through LMAS of multiplex circuits connecting the connection interface concerned to the communication circuit of the unit which comprises them.

Figure 9:
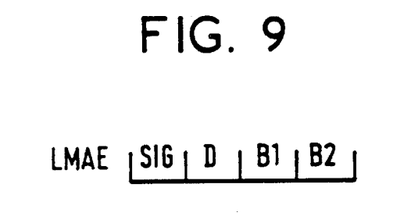

To this end a particular frame structure is employed for the time-division multiplex circuits LMA through LMQ to allow for the structure chosen for the circuits L1 and L4, this being shown in FIG. 9.

To allow for the fact that "m" channels of the circuits L1 or L4, some at the start and the others in the middle of a frame, are systematically reserved for the circuits between interface controllers and control units and are not available for transfer of bytes from connection interfaces of telephones or terminals, there is provision for sending at the start of frames on the circuits such as LMAE, . . . LMQE between connection interfaces and communication circuits the signalling bytes SIG, as shown in FIG. 9, because these are not sent earlier.

In the present example for a connection interface as defined hereinabove having four links for connecting it to the communication circuit of an interface controller which comprises it and serving eight terminals with each of these links, the signalling bytes SIG and D of the last of the eight terminals served by a link are thus sent at the start of a frame before the B1, B2, SIG and D bytes of the first terminal followed in order by the bytes from the other terminals, up to the two bytes B1 and B2 from the last of them, at the end of the frame.

Figure 10:
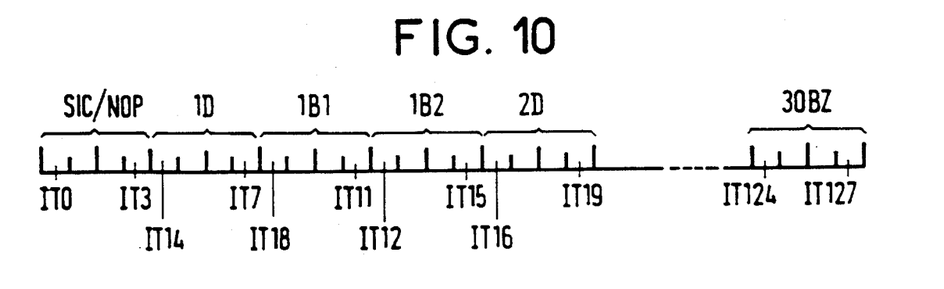

This produces a system on the circuits L1 and L4, as shown in FIG. 10, in which (and consistently with the previous systems) the first four time slots IT0–IT3 at the start of the frame are reserved for transferring signalling bytes SIC from a control unit communication circuit 4 to another unit to which said control unit is connected by a point-to-point circuit; in the operational phase they handle the transfer of bytes NOP characteristic of non-use if the unit that sends them is not a control unit.

The next four time slots IT4–IT7 can be used by a communication circuit 4 of a unit to transfer four bytes each from a first D type signalling channel of one of four incoming links LMAE through LMQE of the time-division multiplex circuits LMA through LMQ connected to the communication circuit 4; bytes NOP characteristic of non-use are substituted for these D type channel bytes when the latter are not used at the unit of which the communication circuit 4 in question is part.

The next four time slots IT8–IT11 are for use by a communication circuit 4 to transfer four bytes each from a first of the B channels (1B1, for example) of one of the four incoming links LMAE–LMQE connected to the communication circuit 4. The same applies to the next four time slots IT12–IT15 assigned to the first four channels 1B2 associated with the four channels 1B1 considered above, bearing in mind that the same subscriber terminal or dedicated circuit to which a time-division multiplex circuit is connected may have two channels B1, B2 and two signalling channels D and SIG (FIG. 8).

The next 12 time slots IT16–IT27 have an assignment reproducing that of the bytes IT4–IT15 where the first four time slots IT16–IT19 are assigned to the bytes 2D of the second of the B channels of the incoming links LMAE–LMQE and where the time slots IT20–IT27 are assigned as follows: the first four to the bytes of the second channels 2B1 and the second four to the bytes of the channels 2B2 (not shown) of the incoming links referred to above.

In the example under consideration, two large groups made up of five subgroups of twelve time slots can therefore be assigned to transfer of bytes of channels D, B1, B2 from a communication circuit via the four incoming links LMAE–LMAQ which are connected to it for the purposes of transmission on a link such as 29ZA, for example, of a point-to-point circuit. Between two successive large groups during the frames are inserted two small groups of four time slots respectively comprising four time slots IT0–IT3 reserved for sending of signalling bytes by a control unit at the start of the frame to another unit and four time slots IT64–IT67 reserved for the sending of signalling bytes in the opposite direction.

These signalling bytes are for example of the message type if they relate to the use of an ISDN terminal or of the command or report type, in change of state bit mode, in the latter case according to whether they are from a control unit or a terminal.

As indicated above, the time slots that are not used on a given link transmit bytes NOP characteristic of non-use in the absence of other data.

There is claimed:

1. Communication system consisting of at most n circuit mode supporting switching units interconnected by point-to-point circuits to thereby form a core of a communication installation, wherein each distinct pair of said switching units is interconnected by a different said point-to-point circuit, the point-to-point circuits between said switching units are direct connections forming a communication subnetwork in which all the circuits are structured and managed in exactly the same manner, each of said switching units has exactly one respective integrated communication circuit for communicating with the switching units to which it is connected by the point-to-point circuits, all said communications circuits being of a same type, each said communication circuit has exactly n point-to-point circuit ports, each of said point-to-point circuits being connected to a different one of said n point-to-point circuit ports and providing exactly p point-to-point channels, to thereby supply the respective switching unit with p point-to-point channels to each of said switching units, exactly q time-division multiplex circuit ports each providing exactly r respective multiplex link channels, to thereby supply the respective switching unit with q×r link channels serving up to q×r terminal units connected to the respective switching unit, and a microprocessor coupled to said point-to-point circuit ports and to said time-division multiplex circuit ports, for distributing during each frame of duration T, a first set of bytes from said q×r multiplex link channels to one or more of said switching units via said n point-to-point circuit ports, and switching during each said frame of duration T, a second set of bytes arriving on any of up to r×q of said p×n point-to-point channels to respective ones of said q×r multiplex link channels, where n, p, q and r are predetermined positive integers greater than one, n being the maximum number of said switching units in said system, p being the number of channels on each said circuit mode point-to-point circuit, r being the number of channels on each said time-division multiplex link and q being the maxium number of said time division multiplex links per each said communication circuit, such that $p \geq q \times r$.

2. Communication system according to claim 1 wherein each communication circuit comprises an input interface including synchronization means for handling synchronization of incoming data received from point-to-point ports relative to internal clock signals supplied by an internal clock circuit, and serial-parallel means for converting said second set of bytes arriving on said point-to-point channels; and a concentrator switching module having an input connected to an output of said serial-parallel means for selecting said second set of bytes.

3. Communication system according to claim 2 wherein said concentrator switching module is connected to an outgoing multiplex link interface for transferring said second set of bytes arriving on said point-to-point channels to outgoing multiplex links of time-division multiplex circuits associated with said multiplex link channels, and to an input signalling processor for processing control message bytes received from said switching units via said point-to-point circuits.

4. Communication system according to claim 3 wherein each said communication circuit further comprises a control message sender connected to the outgoing multiplex link interface for providing access to said outgoing multiplex links in parallel with the switching module to enable direct injection onto said multiplex links of control message bytes by the microprocessor associated with the communication circuit.

5. Communication system according to claim 4 wherein each integrated communication circuit comprises an output interface for providing parallel access to the n point-to-point circuit ports associated with said communication circuit, an incoming multiplex link interface to which are connected q incoming multiplex links for receiving bytes of speech or data supplied by said incoming multiplex links, an output of said incoming multiplex link interface being connected to an input of said output interface, an output signalling processor coupled to the microprocessor and having an output connected to an input of said output interface for producing messages on behalf of the microprocessor and for sending those messages to a control switching unit of the installation, and a control message receiver also coupled to the microprocessor and having an input connected to an output of the incoming multiplex link interface for preprocessing message type signalling from terminals connected to the switching unit that is received via the incoming multiplex link interface and then sending the preprocessed message type signalling to the microprocessor.

6. Communication system according to claim 4 wherein each integrated communication circuit comprises an output interface for providing parallel access to the n point-to-point circuit ports associated with said communication circuit, an incoming multiplex link interface to which are connected q incoming multiplex links for receiving bytes of speech or data supplied by said incoming multiplex links, an output of said incoming multiplex link interface being connected to an input of said output interface, an output signalling processor coupled to the microprocessor and having an output connected to an input of said output interface for producing messages on behalf of the microprocessor and for sending those messages to a control switching unit of the installation, a state controller having an output connected in parallel with an output of the input interface to an input of the switching module, and a state preprocessor also coupled to the microprocessor and having an input connected to an output of the incoming multiplex link interface for preprocessing state mode bytes received from said incoming multiplex links on behalf of the microprocessor and then sending the preprocessed state mode bytes to the microprocessor.

7. Communication system according to claim 1 wherein each integrated communication circuit comprises an output interface for providing parallel access to the n point-to-point circuit ports associated with said communication circuit, an incoming multiplex link interface to which are connected q incoming multiplex links for receiving bytes of speech or data supplied by said incoming multiplex links, an output of said incoming multiplex link interface being connected to an input of said output interface, and an output signalling processor coupled to the microprocessor and having an output connected to an input of said output interface for producing messages on behalf of the microprocessor and for sending those messages to a control switching unit of the installation.

8. Communication system according to claim 7 wherein the output interface temporarily stores bytes to be sent so that said bytes can be sent during time slots of predetermined channels on the outgoing multiplex links of point-to-point circuits under the control of an internal clock circuit of each said communication circuit.

9. The communication system of claim 1, wherein each of said switching units is connected to itself by a respective one of said point-to-point circuits in the form of a loop between an input terminal and an output terminal of a respective one of said circuit ports.

10. The communication system of claim 1, wherein said terminal units are selected from the group consisting of telephones, terminals, and dedicated special-purpose circuits.

11. Method of communication between circuit mode supporting switching units comprising the steps:

interconnecting each pair of at most n switching units by a respective point-to-point circuit of a communication installation to thereby form a communication subnetwork, structuring and managing all the point-to-point circuits in exactly the same manner, using the same type of communication circuit in each switching unit for communications with the other switching units to which it is connected by the point-to-point circuits, each said communication circuit having n point-to-point circuit ports for subnetwork connections and q time-division multiplex circuit ports for switching unit connections, using a respective microprocessor in each communication circuit to control the distribution of bytes of data during each frame of duration T from the q×r incoming multiplex link channels of said communication circuit to the n point-to-point circuit ports of said communication circuit and from at least some of any r×q channels selected from the p×n channels associated with the n point-to-point circuits of said communication circuit, and identically subdividing each successive frame of duration T into r×q equal time slots on each of the circuit mode point-to-point circuits connecting two switching units of the installation, where n, p, q and r are predetermined positive integers greater than one, n being the maximum number of said switching units in said system, p being the number of channels on each said circuit mode point-to-point circuit, r being the number of channels on each said time-division multiplex circuit and q being the number of said time division multiplex circuits per each said communication circuit, such that $p \geq q \times r$.

12. Method of communication according to claim 11 wherein any sending of data between a control switching unit of the installation and an interface controller over a point-to-point circuit
is preceded by an access request sent by the originator to the recipient and
is dependent on the reception of an authorization to send sent by the recipient to the originator when the latter is ready to receive.

13. Method of communication according to claim 12 wherein the sending of data between a control switching unit of the installation and an interface controller over a point-to-point circuit is in the form of a message made up of a series of bytes transmitted in blocks in a common channel during successive frames, said message comprising
a flag byte,
a byte giving the length of the message and
the data bytes.

14. Method of communication according to claim 10 further comprising the steps assigning the p=r×q channels on each point-to-point circuit such that m of the channels are reserved for transferring signalling from the control switching units to the interface controllers and from the interface controllers to the control switching units, and assigning the remaining p−m channels to transfer of data.

15. Method of communication according to claim 14 further comprising the steps dividing each said frame into respective first half-frame and a respective second half-frame, each of said half-frames containing at least m/2 of said time slots, reserving m/2 of said time slots at a beginning of each said first half-frame for transferring signalling from said control switching units to said interface controllers and assigning m/2 equal of said time slots at a beginning of each said second half-frame for transferring of signalling from said interface controllers to said control switching units, where m is an integer substantially less than p, and each of the p=r×q channels of each point-to-point circuit corresponds to a different respective one of the p=r×q time slots of each frame on sad point-to-point circuit.

* * * * *